US006089798A

United States Patent [19]

Wierspecker et al.

[11] Patent Number: 6,089,798

[45] Date of Patent: Jul. 18, 2000

[54] DEVICE FOR COUPLING A TOOL TO A HAND-HELD TOOL-DRIVING DEVICE

[75] Inventors: Horst Wierspecker, Leonberg; Heinz Neubert, Ebersbach, both of Germany

[73] Assignee: Robert Bosch GmbH, Stuttgart, Germany

[21] Appl. No.: 08/682,547

[22] PCT Filed: Dec. 24, 1994

[86] PCT No.: PCT/DE94/01535

§ 371 Date: Dec. 2, 1996

§ 102(e) Date: Dec. 2, 1996

[87] PCT Pub. No.: WO95/19244

PCT Pub. Date: Jul. 20, 1995

[30] Foreign Application Priority Data

| | | | |
|---|---|---|---|
| Jan. 14, 1994 | [DE] | Germany | 44 00 970 |
| Feb. 24, 1994 | [DE] | Germany | 44 05 958 |

[51] Int. Cl.[7] ............ B23B 51/00; B23B 31/22

[52] U.S. Cl. ............ 408/226; 279/19.4; 279/19.5; 279/75

[58] Field of Search ............ 408/226, 239 R; 279/19.3–19.5, 75

[56] References Cited

U.S. PATENT DOCUMENTS

| | | | |
|---|---|---|---|
| 5,028,057 | 7/1991 | Wanner | 408/226 |
| 5,076,371 | 12/1991 | Obermeier et al. | 408/226 |
| 5,174,698 | 12/1992 | Obermeier | 408/226 |
| 5,320,459 | 6/1994 | Kleine | 408/226 |
| 5,324,145 | 6/1994 | Kleine | 408/226 |
| 5,340,245 | 8/1994 | Bloeche et al. | 408/226 |
| 5,397,203 | 3/1995 | Kleine et al. | 408/226 |
| 5,518,345 | 5/1996 | Obermeier | 408/226 |
| 5,520,488 | 5/1996 | Obermeier | 408/226 |
| 5,529,444 | 6/1996 | Obermeier | 408/226 |
| 5,529,445 | 6/1996 | Obermeier et al. | 408/226 |
| 5,542,797 | 8/1996 | Obermeier | 408/226 |

FOREIGN PATENT DOCUMENTS 0 433 876 A1 12/1990 European Pat. Off. .

*Primary Examiner*—Steven C. Bishop
*Attorney, Agent, or Firm*—Michael J. Striker

[57] ABSTRACT

A device on hand-held tool-driving machines for the coupling of pounding and/or drilling tools is proposed, wherein on the tool shank (11) and the tool holder (10) are located at least three couplings comprising grooves (17, 18, 22) that run axially to the shank end and coupling gibs (19, 20, 23) on the tool holder (10) that engage in said grooves, and also an axial locking feature comprising a depression (21) in the tool shank (11) that runs axially and is closed toward the shank end and a locking body (16) in the tool holder (10) that engages in said depression, two of said couplings (17, 19 and 18, 20) being at least partially opposite one another. For the purpose of uniform torque loading of tool shank (11) and tool holder (10), the couplings located one behind the other on the shank circumference starting from the axial locking feature are positioned with their coupling flanks on a circumferential angle of >180°, <240° (FIG. 1).

15 Claims, 3 Drawing Sheets

DEVICE FOR COUPLING A TOOL TO A HAND-HELD TOOL-DRIVING DEVICE

BACKGROUND OF THE INVENTION

The invention proceeds from a device on hand-held tool-driving machines for coupling pounding and/or drilling tools as well as from a tool and tool holder used with that device.

Such a device is known from EP-433 876 A1 for a tool shank. Drilling tools are designed to rotate clockwise. They are driven by the tool holder of hand-held tool-driving machines accordingly so as to rotate in a right-handed manner, i.e., in the clockwise direction. Since FIG. 5 of EP 0 433 876 A1 shows a cross section (per II—II from FIG. 1) towards the shank end, the drive direction of rotation in that case is counter-clockwise. Thus in that case the narrower of the two coupling grooves that are opposite one another is positioned in front of the locking depression in the direction of rotation. These configurations of couplings, however, bring about a non-uniform torque loading on the tool shank and on the tool holder, since first of all the axial locking feature does not transmit any significant torques and since secondly the following wider coupling has a coupling flank that is located on the side of this coupling that faces away from the axial locking feature. The three coupling flanks in that case lie within a circumferential range of less than 180°0.

SUMMARY OF THE INVENTION

The invention's configuration of couplings according to the characterizing feature of the invention has the advantage that torque loading is significantly more uniform over the circumference of the tool shank and the tool holder, since the torque-transmitting flank of the coupling positioned in front of the axial locking feature has now been moved substantially closer to the less loaded axial locking feature. Another advantage can be considered the fact that the more uniform torque loading also improves centering in the holder, counteracts one-sided wear, and reduces tool endangerment from shank breakage between the couplings.

As a result of the further measures, advantageous developments and improvements of the characteristics given in the main claims are obtained. For example, it is advantageous for long tool-shank life if the coupling that is at least partially opposite the axial locking feature corresponds in cross section approximately to that of the narrower of the two couplings that are opposite one another. However, in order to increase the wear allowance, particularly for the coupling gibs of the tool holder, it is advantageous if the coupling opposite the axial locking feature corresponds approximately to the cross section of the wider of the two couplings that are opposite one another. In this case wear can also be influenced by the use of appropriate materials for tool and tool holder.

A particular development of the device according to the invention consists in the fact that the tool shank of the tool designed in accordance with the invention is also designed to be compatible with known work holders in which the coupling and the axial locking feature are formed by two diametrically opposite, cylindrical locking bodies (e.g. Hilti drilling hammer TE10). For this purpose it is provided that the coupling groove on the tool shank that is at least partially opposite the axially closed locking depression be combined with an additional locking depression so that, on the one hand, when such a tool shank is inserted into a tool holder according to the invention the middle coupling groove receives a coupling gib of the tool holder, whereas, on the other hand, when the tool shank is inserted in the aforementioned known tool holder the second locking body engages with a locking effect in the second additional locking depression that is only partially closed on the axial ends.

BRIEF DESCRIPTION OF THE DRAWINGS

Three embodiments of the invention are shown in the drawing and explained in greater detail in the following description.

DESCRIPTION OF THE EMBODIMENTS

Figure 1:
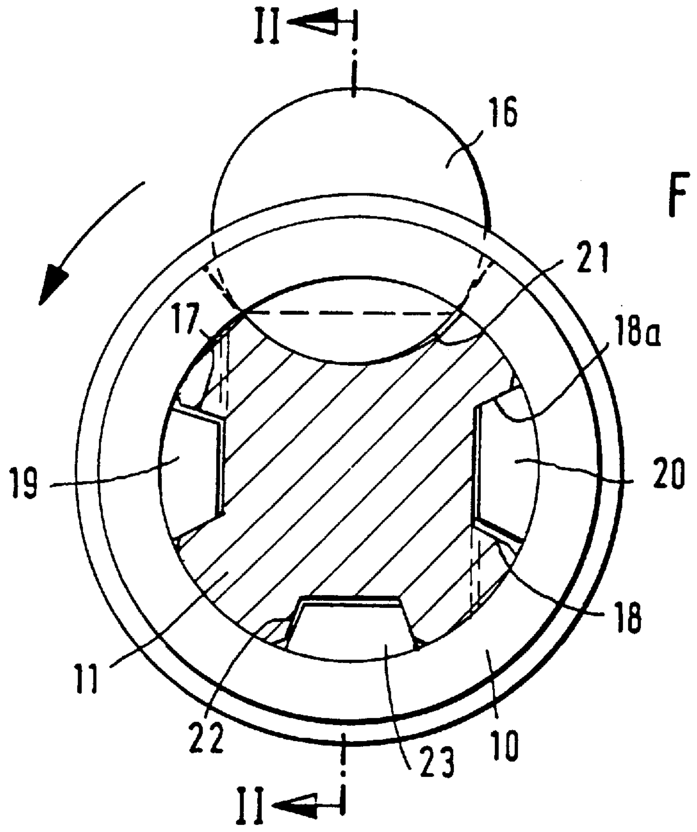
FIG. 1 shows a cross section through a device according to the invention for torque transmission on a drilling hammer, having a tool holder and a shank inserted in it.

The device on tool-driving machines for coupling pounding and/or drilling tools in accordance with the invention, in particular on impact drilling machines and drilling hammers or pounding devices, comprises essentially a tool holder 10 acting as tool carrier and a tool shank 11 inserted in it of a tool 12 used for drilling and/or pounding. In the first embodiment shown in FIGS. 1 and 2, the work holder 10 is seated torsionally secure and in a manner known from WO 88/09245 at the end of a driven hollow-cylindrical tool spindle 13 of a drilling hammer that is not shown. In the tool spindle's rear area, not shown, a riveting set is guided such that it is axially movable, and said set is struck in a known manner by a pounding mechanism on the end of the tool shank 11. The work holder 10 has a seating hole 14 for the tool shank 11 and also an opening 15 for a locking body 16 inserted in said shank, which body can be moved radially to the outside in a known manner when the tool shank 11 is inserted in the seating hole 14 and is locked in the rest position shown in the figure by a locking bushing, not shown, in a known manner by means of elastic force.

The tool 12 is provided on the tool shank 11 with two coupling grooves 17 and 18 that are open towards the shank end, are opposite one another, and run axially, into which grooves two coupling gibs 19, 20 engage, which project inward into the seating hole 14 and run axially. The coupling grooves 17 and 18 and also their coupling gibs 19 and 20, respectively, are of different widths and have flanks running approximately radially on both longitudinal sides. Between the couplings formed as described is located an axially running locking depression 21 that is offset by 90° in the tool shank, in which the cylindrical locking body 16 engages. The locking body is spherically rounded on the front and back ends, and the locking depression 21 shaped as a groove is curved spherically in a corresponding way and closed off, at least toward the shank end, so that the locking body 16 and locking depression 21 form an axial locking feature, for the purpose of preventing the tool from falling out or being pulled out of the tool holder 10 inadvertently. In the area of the tool shank 11 and the tool holder 10 opposite the axial locking feature there is an additional coupling, which is also formed by a coupling groove 22 running axially and open toward the shank end and by a coupling gib 23 in the seating hole 14 of the tool holder 10 that runs axially and engages into said coupling groove.

To achieve the most uniform possible loading of the tool holder 10 and the tool shank 11 of the device driven in the direction indicated by the arrow, it is provided that the wider of the two couplings opposite one another 17/19 and 18/20 be located in front of the axial locking feature 16/21 when viewed in the direction proceeding circumferentially from the other couplings. Although the torque-transmitting flank 18*a* of the wider coupling groove 18 is therefore a smaller distance away from the locking depression 21, this is balanced out, however, with respect to the uniform torque loading of the tool shank 11 by the fact that the locking body 16 transmits only a small torque to the tool shank. In this way, moreover, the centering and guidance of the tool shank is improved and the wear caused particularly in the case of couplings that have already deflected is reduced by better centering.

Figure 2:
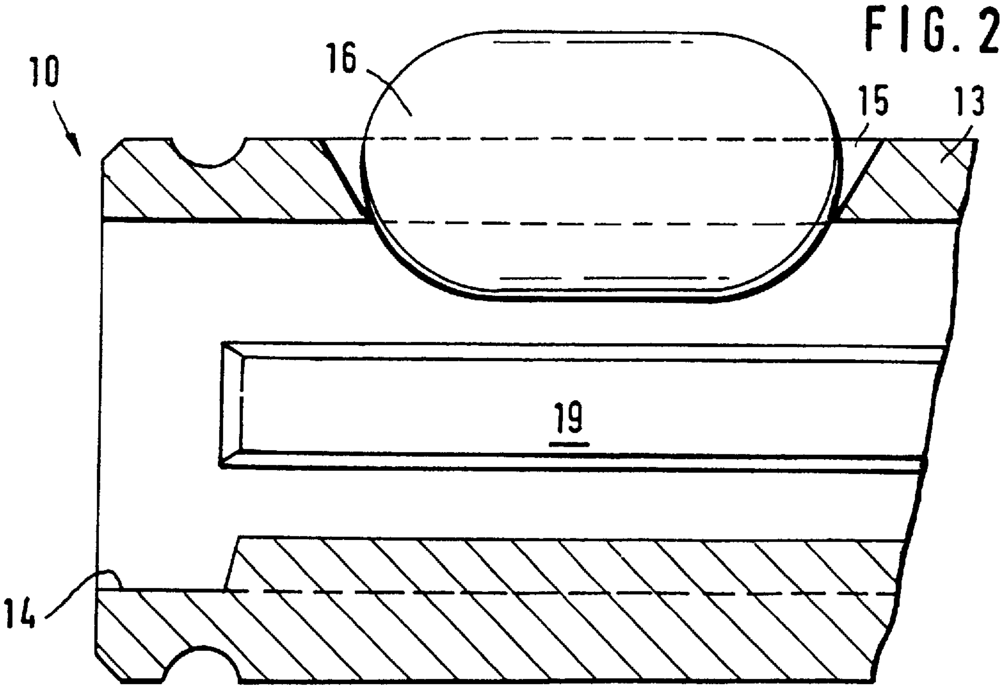
FIG. 2 shows a longitudinal section through the front section of the tool holder.
Figure 3:
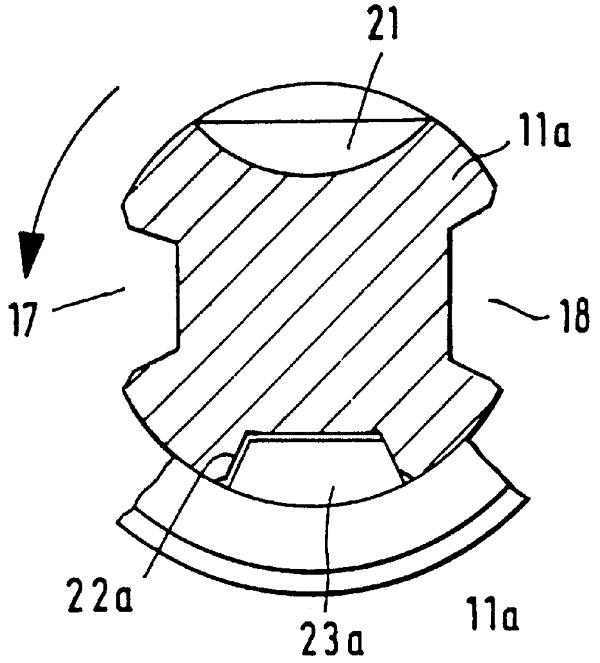
FIG. 3 shows as an additional embodiment the cross section through the shank of a tool.
Figure 4:
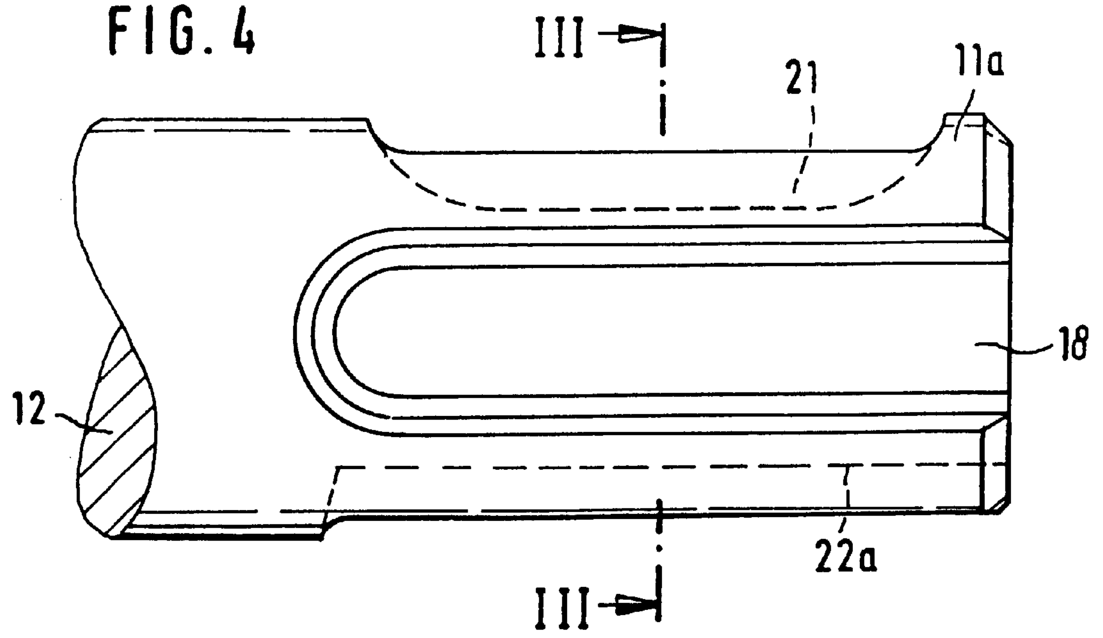
FIG. 4 shows the shank end of the tool.

Whereas in the first embodiment as shown in FIGS. 1 and 2 the third coupling opposite the axial locking feature, comprising the coupling groove 22 and the coupling gib 23, has approximately the same cross section as the narrower of the two couplings that are opposite one another, comprising the coupling groove 17 and the coupling gib 19, in the second embodiment as shown in FIGS. 3 and 4 the third coupling opposite the locking depression 21, comprising the coupling groove 22*a* and the coupling gib 23*a* engaging into it, is shaped in cross section in correspondence to the wider coupling formed by coupling groove 18 and coupling gib 20. This design is advantageous, particularly with respect to a high wear allowance on the coupling gibs 20 and 23*a* of the tool shank 11*a*, whereas in the first embodiment the wear allowance on the tool shank 11 formed by the distance between the grooves 17, 18 and 22 is more favorable because of the two narrower couplings.

As indicated in FIG. 1 by the broken line, the groove root of at least one of the coupling grooves can run in chord-shaped fashion to the shank circumference in place of the rear flanks, in order, for example, to thereby increase the wear allowance of the tool holder, since the coupling gib interacting with it likewise runs on the rear side in chord-shaped fashion to the circumference of the seating hole. Essential to the invention, however, is the fact that on the three couplings 17, 19 and 22, 23 and 18, 20 located one behind the other on the shank circumference and hole circumference, respectively, starting from the axial locking feature 16, 21, the coupling flanks lie on a circumferential angle greater than 180° and smaller than 240°, as a result of which a distribution of the torque-transmitting flanks is achieved that is favorable with respect to concentric running and wear.

Figure 5:
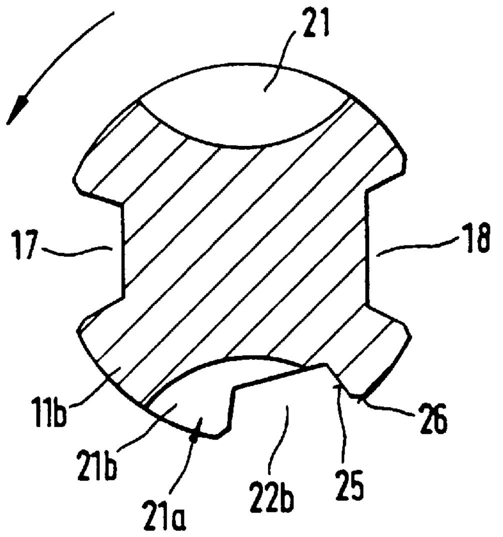
FIG. 5 shows as a third embodiment a cross section through a tool shank with a combined coupling groove and locking depression.
Figure 6:
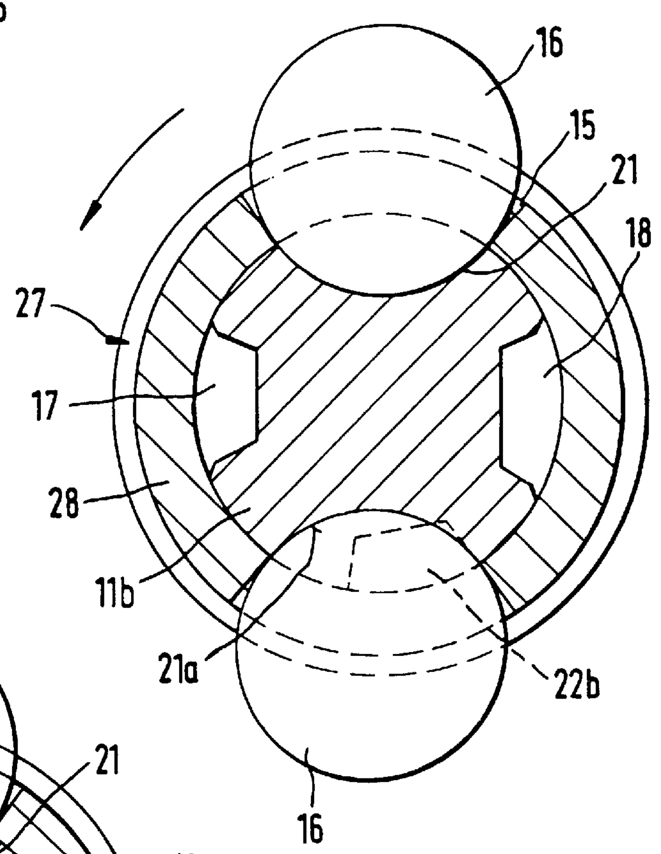
FIG. 6 shows this tool shank in a known work holder.
Figure 7:
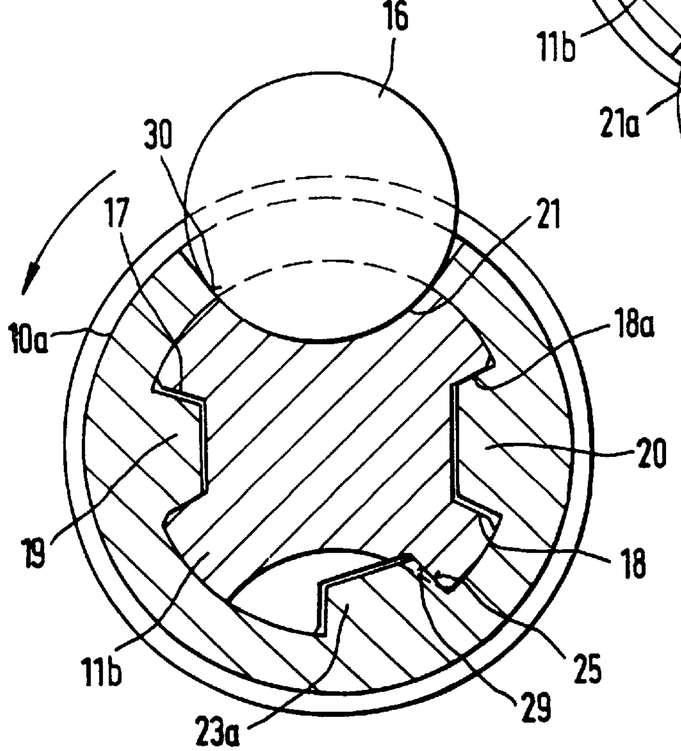
FIG. 7 shows the tool shank in a work holder according to the invention.

In FIG. 5 the cross section through a tool shank 11*b* is shown in highly enlarged form as an additional embodiment, said shank being designed to be compatible for a known tool holder as shown in FIG. 6 as well as for a tool holder according to the invention as shown in FIG. 7. The locking depression 21 located in the upper area of the tool shank 11*b* is shaped to be closed axially on both sides, as shown in FIG. 4, so that in this way a completely sufficient axial locking action already occurs when a locking body 16 drops into place. The middle coupling groove 22*b* is located in the opposite lower area of the tool shank 11*b* and is overlapped by an additional locking depression 21*a* such that the two axial ends of said locking depression 21*a* are only partially closed, namely only as far as the end area 21*b* of said locking depression 21*a* protrudes beyond the cross section of the coupling groove 22*b*.

In order to retain a completely effective coupling flank 25 for the middle coupling groove 22*b* in the case of this compatible shank design, the additional, only partially closed-off locking depression 21*a* is located exactly diametrically opposite the axially closed locking depression 21, and the middle coupling groove 22*b* is arranged asymmetrically with respect to this additional locking depression 21*a* such that its coupling flank 25 is aligned with the flank 26 of this additional locking depression 21*a* that is located and runs in the direction of rotation.

If a tool with a tool shank 11*b* shaped as shown in FIG. 5 is inserted in a known tool holder 27 as shown in FIG. 6, then the coupling grooves 17 and 18 that are opposite one another remain free and the two locking bodies 16 diametrically opposite one another in the two openings 15 of a spindle 28 (shown in cross section) of the tool holder 27 drop into the locking depressions 21 and 21*a* with locking action. The second locking depression 21*a* is in this case weakened with respect to axial locking action by the cross section of the middle coupling groove 22*b*, indicated by a broken line, but this is immaterial, however, since the upper locking depression 21 that is completely closed axially already guarantees sufficient axial locking action. However, in this case as well, the coupling is secured by the coupling flank 25 of the middle coupling groove 22*b*.

FIG. 7 shows the cross section through a coupling device on tool-driving machines in accordance with the invention, said device having the compatible tool shank 11*b* shown in FIG. 5. In contrast to the tool holder 10 shown in FIG. 1, the middle coupling gib 23*a* in FIG. 7 that is partially opposite the locking body 16 is offset in the drive direction such that its coupling flank 29 is now diametrically opposite the flank 30 of the locking body 16 that is in front when viewed in the drive direction. This measure guarantees that even in the area of the additional, partially open locking depression 21*a* of the compatible tool shank 21*b*, the flank 25 of the middle coupling groove 22*b* is also fully loaded.

To prevent damage to the lower locking body 16 of the known tool holder shown in FIG. 6 resulting from the radially running coupling flank .25 of the middle coupling groove 22*b*, it can be advisable, in place of a radial coupling flank 25, if said flank and also the flank 29 interacting with it on the coupling gib 23*a* of the tool holder 10*a* shown in FIG. 7 be designed so as to be curved, following the course of the locking depression 21*a*, as indicated in FIG. 7 by the broken line. As an alternative, however, the additional locking depression 21*a* can also be combined with a middle coupling groove 22, as shown in FIG. 1, or 22*a*, as shown in FIG. 3, that is diametrically opposite the upper locking depression 21. Since in any case the upper locking depression 21 is sufficient for axial locking action, the middle coupling groove 22 located opposite to it and the middle coupling gib 23 engaging into it can also have in cross section the curved shape of the upper locking depression 21 in order to guarantee compatibility of the tool shank 11 with a tool holder 27 as shown in FIG. 6.

What is claimed is:

1. A device on hand-held tool-driving machines for coupling a pounding and drilling tool, comprising at least approximately uniformly distributed at least three couplings and one axial locking feature on a circumference of a tool shank and of a tool holder, said axial locking feature including a depression in said tool shank that runs axially and is closed at least toward a shank end, and a radially movable locking body with which said depression interacts and which projects inward from a seating hole of said tool holder, said couplings on said tool shank being shaped as recesses running axially to said shank end and also as projections on the circumference of said tool holder running axially and interacting with said recesses, two of said couplings being at least partially opposite to one another, said couplings being located one behind the other on the tool shank circumference starting from said axial locking feature and having coupling flanks lined on a circumferential angle greater than 180° and smaller than 240°.

2. A device as claimed in claim 15, wherein said coupling includes couplings which are at least partially located opposite to one another and have different width including a wider coupling and a narrower coupling, said wider coupling being positioned in front of said axial locking feature in a direction proceeding circumferentially from the other couplings.

3. A device as defined in claim 2, wherein said recesses are formed as grooves and said projections are formed as gibs engaging into said grooves.

4. A device as defined in claim 2, wherein said couplings include a coupling which is located at least partially opposite said axial locking feature and includes a groove which forms said recess and runs axially in said tool shank, and a corresponding gib which forms said projection in said tool holder engaging into said groove, said groove having a cross-section which corresponds at least approximately to a cross-section of the narrower one of said two couplings that are opposite to one another.

5. A device as defined in claim 2, wherein said couplings include a coupling which is located at least partially opposite said axial locking feature and includes a groove which forms said recess and runs axially in said tool shank, and a corresponding gib which forms said projection in said tool holder engaging into said groove, said groove having a cross-section which corresponds at least approximately to a cross-section of the wider one of said two couplings that are opposite to one another.

6. A device as defined in claim 1, wherein said recesses are formed as coupling grooves and said projections are formed as coupling gibs engageable in said coupling grooves, at least one of said coupling gibs in said coupling grooves running on its rear side in chord-shaped fashion to a circumference of said seating hole home or said tool shank correspondingly.

7. A tool for a hand-held tool-driving machine, comprising a tool shank provided with at least three axial coupling grooves running to a shank end and also with a locking depression running axially and closed toward said shank end, said coupling grooves including coupling grooves which are at least approximately opposite to one another and have different width, said coupling grooves which are located at least approximately opposite to one another including a wider coupling groove which is positioned in front of said locking depression in a direction proceeding circumferentially from the other coupling grooves.

8. A tool as defined in claim 7, wherein said coupling grooves include a coupling groove which is located opposite to said locking depression and has a cross-section at least partially corresponding to a cross-section of a narrower one of said two coupling grooves that are opposite to one another.

9. A tool as defined in claim 7, wherein said coupling grooves include a coupling groove which is located opposite to said locking depression and has a cross-section at least partially corresponding to a cross-section of the wider one of said two coupling grooves that are opposite to one another.

10. A tool as defined in claim 7, wherein said tool shank has an additional locking depression which overlaps said coupling groove located at least partially opposite to said locking depression, so that two axial ends of said locking depression are closed only partially in an area extending beyond a cross-section of said coupling grooves.

11. A tool as defined in claim 10, wherein said tool shank has a further locking depression located diametrically opposite to said axially closed locking depression, said coupling groove which is located at least partially opposite to said axially closed locking depression being positioned asymmetrically relative to said further locking depression such that its coupling flank is aligned with a flank of said further locking depression.

12. A tool holder for a hand-held tool driving machine, comprising a tool holder body having a seating hole and provided with at least three coupling gibs; a radially movable locking body arranged in said seating hole, said coupling gibs including coupling gibs which at least approximately are located opposite to one another and have different widths, said coupling gibs located at least approximately opposite to one another including a wider coupling gib which is position in front of said locking body in a direction proceeding circumferentially from the other coupling gibs.

13. A tool as defined in claim 12, wherein said coupling gibs include a coupling gib located opposite to said locking body and having a cross-section which at least approximately corresponds to a cross-section of a narrower one of said two coupling gibs that are located opposite to one another.

14. A tool as defined in claim 12, wherein said coupling gibs include a coupling gib located opposite to said locking body and having a cross-section which at least approximately corresponds to a cross-section of the wider one of said two coupling gibs that are located opposite to one another.

15. A tool as defined in claim 12, wherein said coupling gibs include a coupling gib which is located at least partially opposite said locking body and is offset in a drive direction such that its coupling flank is diametrically opposite to a flank of a locking body that is in front in the drive direction.

* * * * *